United States Patent
Hartmann

[15] 3,651,546
[45] Mar. 28, 1972

[54] FASTENING ELEMENT DEPENDENTLY SUPPORTED FROM A C-SHAPED MOUNTING MEMBER

[72] Inventor: Manfred Hartmann, Frastanz, Austria

[73] Assignee: Hilti Aktiengesellschaft, Schaan, Liechtenstein

[22] Filed: Oct. 9, 1970

[21] Appl. No.: 79,374

[30] Foreign Application Priority Data

Oct. 17, 1969  Germany ................... P 19 52 431.3

[52] U.S. Cl. ................... 24/73 SA, 24/73 RM, 16/93, 248/58, 248/224
[51] Int. Cl. ................... A44b 21/90, E21f 17/02, A47f 5/00
[58] Field of Search ................... 24/73 SA, 73 RM, 265 CT; 248/58, 73, 119, 361 T; 16/87.2, 93

[56] References Cited

UNITED STATES PATENTS

| | | | |
|---|---|---|---|
| 2,318,853 | 5/1943 | Hall | 24/73 SA |
| 2,615,226 | 10/1952 | Kral | 24/73 RM |
| 2,931,471 | 4/1960 | Howard | 24/73 RM |
| 3,226,069 | 12/1965 | Clarke | 248/73 |
| 3,443,783 | 5/1969 | Fischer | 248/220.5 |

Primary Examiner—Paul R. Gilliam
Attorney—McGlew and Toren

[57] ABSTRACT

A fastening element for dependently supporting pipe clamps and similar devices from an elongated C-shaped mounting member includes an elongated tubular-shaped member containing a resilient body formed of an elastically deformable material, such as rubber. The tubular-shaped member has a pair of slotted side walls and its dimensions relative to the C-shaped mounting member are such that it can be inserted through the opening formed by the mounting member and then rotated until the slotted portion of its side walls bear on the mounting member. Further, when the tubular member is supported within the mounting member, the resilient body is in deformed contact with the mounting member for holding the tubular-shaped member in its supported position.

25 Claims, 5 Drawing Figures

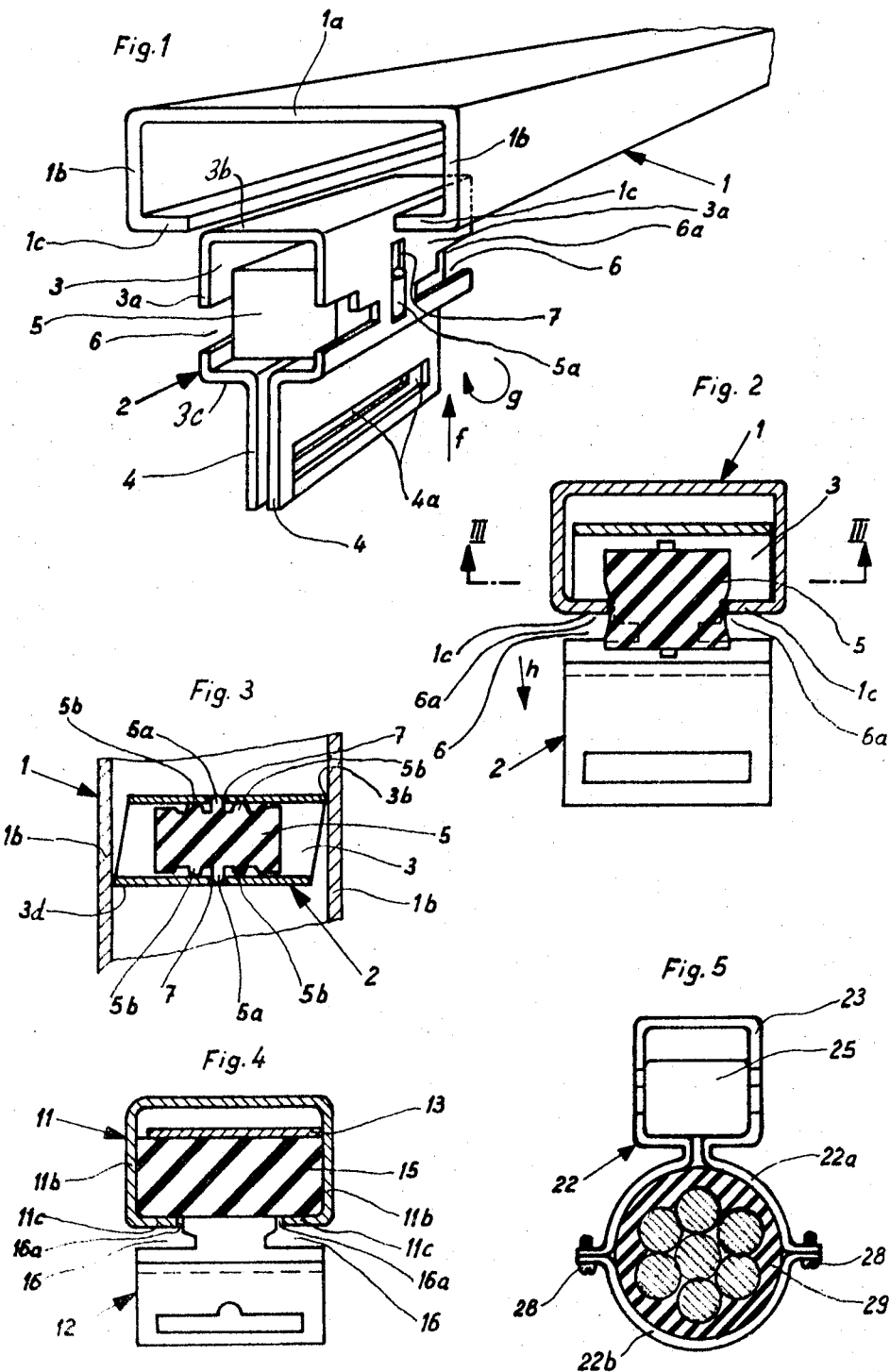

3,651,546

FASTENING ELEMENT DEPENDENTLY SUPPORTED FROM A C-SHAPED MOUNTING MEMBER

SUMMARY OF THE INVENTION

The present invention is directed to a fastening element for a suspension device, such as for supporting pipe hanger straps, pipe clamps, cable clamps and the like and, more particularly, it is directed to the structure of an elongated tubular shaped member having slotted sides which are engageable in a locked supported position within a C-shaped mounting member. The tubular-shaped member is dimensioned so that it can be inserted into the C-shaped mounting member and then rotated with its slotted surfaces bearing on the mounting member.

Fastening elements of the general type mentioned above, with openings for fastening pipe hanger straps, are formed with a flange which engages the C-shaped mounting member in a bayonet-lock arrangement. On the fastening element, opposite the flange, lugs are provided which serve as abutments, so that, after the fastening element is located in its support position within the mounting member, the supporting webs or walls of the mounting member are clamped between the flange and the lugs with the result that the fastening element is held against displacement.

This suspension device has the disadvantage, on one hand, that the fastening element cannot be moved after its assembly within the mounting member for effecting alignment of the pipe line, and on the other hand, the fastening element is not secured against turning. Additionally, the manufacture of the fastening element is rather complicated, which factor impairs the economy of its production.

In known suspension device of the type described above, longitudinal grooves are formed in the base wall of the mounting member so that the flange of the fastening element is clamped between the base wall and the supporting webs of the mounting member. In addition to the disadvantages mentioned above, this embodiment has the further disadvantage that special supporting rails are required for effecting the assembly operation.

Therefore, the primary object of the present invention is to provide a fastening element for economical assembly of fastening elements of the type mentioned above, while avoiding the disadvantages previously experienced in the art.

In accordance with the present invention, the fastening element is made up of a tubular shaped member with a substantially rectangularly shaped cross section, and a resilient body formed of an elastically deformable material, such as rubber, which resilient body is held in deformed engagement between either the opposite side walls of the mounting member or the edges of its supporting bottom walls which form the opening into the mounting member.

Since the resilient body positioned within the tubular shaped member is disposed in deformed engagement with the mounting member, the fastening element is sufficiently secured against accidental displacement, and, at the same time, for fine alignment of the pipe line or other member suspended from the fastening element, it is possible to move the fastening element by hand. Furthermore, the fastening element is simple to manufacture, since its tubular shaped member can be stamped out of a sheet metal strip and subsequently bent into the desired shape.

Another characteristic of the present invention is the provision of slots extending inwardly from the edges of the side walls of the member, that is in the walls extending transversely of the mounting member when the fastening element is in its support position in the mounting member. The lower portion of the slots in the side walls extend a greater distance inwardly from the ends than the upper portion of the slots, and the adjacent ends of the upper portions of the slots are spaced apart slightly less then the distance between the supporting webs or bottoms walls of the mounting member. Due to the slotted configuration of the side walls, after the fastening element has been inserted into the mounting member and rotated so that its side walls extend transversely of the longitudinal axis of the mounting member, the fastening element can be pulled downwardly for the extent of the height of the slots so that the tubular shaped member is positively secured in bearing engagement on the mounting member and is held in a very simple and effective manner against turning. With this slotted construction it is not necessary to use lugs which must be bent off in an additional operation, such as previously employed in such fastening elements.

In a preferred embodiment of the fastening element, the height of the resilient body is less than the height of the interior cross section of the tubular shaped member, accordingly, after the fastening element is rotated into position and is pulled downwardly, the resilient body remains in place and only the tubular shaped member is moved. This arrangement has the advantage that the tubular shaped member can be displaced downwardly by hand into the locking position between its slots and the supporting webs of the mounting member and, as a result, there is no need to overcome the frictional force with which the resilient body is held in deformed engagement by the mounting member.

Another feature of the present invention is the provision of slot-like openings in the side walls of the tubular shaped member extending transversely to the direction of the slots which assist in the positioning and support of the tubular shaped member in the mounting member. The resilient body has ribs extending outwardly from its side surfaces which fit in sliding engagement within the slot-like openings in the tubular shaped member and due to this construction the resilient body can be secured in position relative to any movement of the tubular shaped member.

Preferably, protuberances are formed on the sides of the resilient body which are in frictional engagement with the interior side walls of the tubular shaped member so that the fastening element assembly is secured against accidental upward displacement.

The various features of novelty which characterize the invention are pointed out with particularity in the claims annexed to and forming a part of this specification. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWING

In the drawing

FIG. 1 is a perspective view of a fastening element, in accordance with the present invention, positioned for insertion into an elongated mounting, member;

FIG. 2 is a cross-sectional view of the fastening element in FIG. 1 in position supported within the mounting member;

FIG. 3 is a sectional view taken along line III—III of FIG. 2;

FIG. 4 is a cross-sectional view of another embodiment of a fastening element in accordance with the present invention positioned within a mounting member; and FIG. 5 is a vertical view of still another embodiment of a fastening element in accordance with the present invention.

DETAILED DESCRIPTION OF THE INVENTION

In FIG. 1, a suspension device for pipe cable and the like, is formed of a C-shaped mounting member 1 and a fastening element 2 which is insertable into a supported position within the mounting member. The mounting member 1 has an upper wall 1a which is secured to a ceiling or similar surface so that the mounting member is dependently supported. A pair of side walls 1b extend downwardly from the opposite edges of the upper wall 1a and at the lower end of each of the side walls 1b an inwardly directed support wall or web 1c is provided. The inner edges of the support webs 1c are spaced apart providing an opening into the interior space in the C-shaped mounting member. As indicated in FIG. 1, the elongated fastening element 2 is positioned so that its longitudinal dimension is disposed in parallel relationship with the longitudinal axis of the mounting member 1 and is positioned in alignment with the opening between the inner edges of the support walls 1c so that the fastening element can be inserted into the mounting member.

As shown in FIG. 1, the fastening element 2 is made up of a tubular shaped member 3 with a pair of supporting walls 4 extending downwardly from the lower surface of the tubular shaped member, and a resilient body 5 formed of an elastically deformable material, such as rubber, is positioned within the interior of the tubular shaped member. Adjacent the lower ends of the supporting walls 4, slots 4a are provided through which a pipe hanger strap or similar device can be secured. The tubular shaped member 3 has a generally rectangular cross section transverse to its longitudinal dimension and its tubular cross section is defined by a pair of side walls 3a, an upper wall 3b and a pair of bottom walls 3c from which the support walls 4 depend. Each of the side walls 3a has a slot 6 extending inwardly from each of its opposite ends. The inner ends of the slots 6 have a stepped configuration so that in the upper portion of the slots the adjacent ends are spaced further apart than are the adjacent ends in the lower portions of the slots. The arrangement of the slots is symmetrical in both of the side walls 3a of the tubular shaped member 3. Additionally, slot-like openings 7 are formed in the side walls 3a extending transversely to the slots 6 and positioned between the inner ends of the slots 6. Extending outwardly from the sides of the resilient body 5 are ribs 5a which are secured in sliding engagement within the slot-like openings 7 for guiding the resilient body when there is relative movement between the tubular shaped member and the resilient body. As shown in FIG. 1, the tubular shaped member 3 along with the resilient body 5 which it encloses, is inserted into the mounting member 1 in the direction of the arrow f and when the tubular shaped member has been inserted to the extent that the lower portion of the slots 6 are located in the plane of the supporting webs 1c, the fastening element is rotated, note the arrow g, and the upper portion of the slots are then lowered into bearing engagement against the upper surfaces of the supporting webs 1c.

As indicated in FIG. 1, the side walls of the resilient body 5 is in form fitting or surface contacting engagement with the side walls 3a of the tubular shaped member 3 and, as illustrated in FIG. 2, when the fastening element is rotated into its support position within the mounting member the ends of the resilient body are held in deformed engagement between the opposed edges of the supporting webs 1c. The deformed engagement provided between the supporting webs and the resilient body secures the fastening element 2 in position. As indicated above, after the fastening element 2 is rotated into the support position within the mounting member 1, it is displaced downwardly, in the direction of the arrow h in FIG. 2, so that the smaller upper portion 6a of the slots 6 bear against the upper surface of the supporting webs and, because the spacing between the adjacent ends of the upper portion of the slots 6 are only slightly less than the dimension between the inner edges of the supporting webs 1c, the fastening element is secured against turning.

In FIG. 3, it can be noted that the ends of the tubular shaped member 3 transverse to its longitudinal dimension are beveled or cut in parallel planes disposed at an acute angle to the longitudinal axis of the tubular shaped member. Due to the angular disposition of the ends of the tubular shaped member, the member can be located through 90° degrees after it has been inserted through the opening between the edges of the supporting webs 1c until the edge is 3b bear in contacting engagement against the inner surfaces of the side walls 1b of the mounting member, with the result that displacement from the supporting position is prevented.

In FIG. 4 another embodiment of a suspension device is shown with a fastening element 12 dependently supported from a mounting member 11 in a manner similar to that shown in FIG. 2. However, in FIG. 4, a resilient body !15 is provided which extends for the full dimension between the interior surfaces of the side walls 11b of the mounting member. In this embodiment a tubular shaped member 13 is provided containing the resilient body within its interior and the tubular shaped member is provided with slots 16 with the upper and lower portions of the slots being configured generally in accordance with that shown in FIGS. 1 and 2. When the tubular shaped member 13 is inserted into the mounting member 11 with the supporting webs 11c of the mounting member disposed in the plane of the lower portion of the slots 16 in the tubular shaped member, the member 13 is rotated until its longitudinal dimension extends transversely of the opening in the mounting member. With the tubular shaped member 13 located in its support position it is lowered so that the edge of the upper portions of the slots 16 bear against the upper surfaces of the support webs 11c, and in this arrangement the ends of the resilient body 15 are disposed to deformable contact with the inner surfaces of the side walls 11b of a mounting member. In FIG. 2 the resilient body 5 is in contact with only the edge portions of the supporting webs, while the arrangement shown in FIG. 4 the end surfaces of the resilient body 15 are in deformable contact with the interior surface of the side walls 11b of the mounting member 11. The end faces of the resilient body 15 in frictional contact with the surfaces of the side walls 11b of the mounting member assure protection that the tubular shaped member will not rotate or turn from its support position and, as a result, the upper offset portions 16a of the slots 16 can be eliminated as a safety device against displacement.

In FIG. 5 a fastening element 22 is illustrated, in accordance with the present invention, for suspending a cable from a mounting member, not shown. The fastening element 22 is composed of a tubular shaped member 23 which is secured within a mounting member and the upper half 22a of the cable securing member extends downwardly from the lower end of the tubular shaped member 23. After the tubular shaped member is inserted into and rotated within the mounting member so that it is located in the support position, a cable 29 is positioned within the upper half 22a of the cable support member and then the lower half 22b of the support member is secured in position by means of screws 28 which thread into lugs formed on the upper half 22a. The tubular shaped member contains a resilient body 25 to assist in securing it within the mounting member.

What is claimed is:

1. A fastening element arranged to be dependently supported in a C-shaped mounting member having the opening formed by its C-shaped configuration facing downwardly, comprising means for mounting said fastening element within the mounting member so that said means is insertable into and rotatable within the mounting member into a support position held against displacement therein, said means comprising an elongated tubular shaped member having a pair of spaced elongated side members arranged in the upright position when assembled in the mounting member, and a resilient body formed of an elastically deformable material being disposed in contacting engagement with the interior surface of said side members of said tubular member and arranged to be held in deformable engagement with the mounting member, each said side member having slots therein extending inwardly from the opposite ends of said side members and at least a portion of the edges of said slots in said member extending in the direction of the elongation of said side members being disposed in bearing contact on the mounting member when said fastening element is assembled within the mounting member.

2. A fastening element, as set forth in claim 1, wherein said slots being formed in each said side wall a sufficient distance toward the opposite end of said side wall so that the distance between the adjacent ends in the upper portion of said slots is slightly less than the opening formed by the C-shaped configuration of the mounting member.

3. A fastening element, as set forth in claim 2, wherein the ends of the lower portions of said slots being offset from the ends of the upper portions of said slots and being closer together than the ends of the upper portions of said slots.

4. A fastening element, as set forth in claim 1, wherein the height of said resilient body within said tubular shaped member is less than the height of said side members of said tubular shaped member so that in positioning said tubular shaped member in bearing engagement within said mounting member said tubular shaped member is movable relative to said resilient body.

5. A fastening element, as set forth in claim 1, wherein said side members having elongated slot-like openings therein extending transversely of the elongated dimension of said tubular shaped member, and said resilient body comprising ribs formed on and extending outwardly from the sides thereof and said ribs being arranged in slidable engagement within said slot-like openings for affording guidance for said resilient body when relative movement occurs between said tubular shaped member and said resilient body.

6. A fastening element, as set forth in claim 5, wherein protuberances formed on and extending outwardly from the sides of said resilient body being spaced from said ribs extending therefrom, and said protuberances arranged to extend into frictional engagement with the interior surfaces of said side members of said tubular shaped member.

7. A fastening element, as set forth in claim 1, wherein said tubular shaped member having a substantially rectangular cross section transverse to the direction of the elongated dimension of said tubular shaped member.

8. A fastening element, as set forth in claim 1, wherein the planes of the ends of said tubular shaped member transverse to its elongated direction being disposed in parallel relationship and the planes being disposed at an acute angle to the side walls of said tubular shaped member.

9. A fastening element, as set forth in claim 1, wherein said resilient body having its dimension in the elongated direction of said tubular shaped member being less than the dimension of said tubular member in its elongated direction.

10. A fastening element, as set forth in claim 1, wherein said resilient body having its dimension in the elongated direction of said tubular shaped member being equal to the overall length of said tubular shaped member in its elongated direction.

11. A fastening element, as set forth in claim 1, wherein at least one suspension element secured to and extending downwardly from said tubular shaped member in its supported position.

12. A fastening element, as set forth in claim 1, wherein said resilient body is formed of an elastically deformable material having the physical characteristics of rubber.

13. A fastening assembly for dependently supporting pipes, cables and the like, comprising an elongated C-shaped mounting member forming a mounting space therein and having the opening formed by its C-shaped configuration facing downwardly in its support position, a fastening member being insertable into the mounting space in said mounting member through the downwardly facing opening therein and being rotatable within the mounting space into a support position in bearing engagement with said mounting member, said fastening member comprising an elongated tubular shaped member having a pair of spaced elongated side members arranged in the upright position when assembled in said mounting member, and a resilient body formed of an elastically deformable material being disposed in contacting engagement with the interior surface of said side members of said tubular member and arranged to be held in deformable engagement with said mounting member, each said side member having slots therein extending inwardly from the opposite ends of said side members and at least a portion of the edges of said slots in said side members extending in the direction of the elongation of said side members being disposed in bearing contact with the interior surface of the sides of said mounting member forming the opening therein.

14. A fastening assembly, as set forth in claim 13, wherein said mounting member in the support position having a top wall, a pair of spaced side walls depending downwardly from said top wall and a pair of bottom walls each extending inwardly toward the other from the lower ends of said side walls and the inner edges of said bottom walls being spaced apart to form the opening into the mounting space within said mounting member.

15. A fastening assembly, as set forth in claim 14, characterized therein that in the support position said tubular-shaped member having its side members extending transversely of the elongated direction of said mounting member.

16. A fastening assembly, as set forth in claim 15, wherein the upper portion of the ends of said slots spaced from the ends of said side walls being offset from the lower portion of the ends of said slots spaced from the ends of said side walls, the upper portion of the ends of said slots being spaced apart by a dimension slightly less than the spacing between the inner edges of the bottom walls of said mounting member and the lower portion of the ends of said slots being spaced closer together than the ends of the upper portion of said slots.

17. A fastening assembly, as set forth in claim 13, wherein said resilient body having a height within said tubular shaped body less than the height of said side members thereof.

18. A fastening assembly, as set forth in claim 17, wherein said side members of said tubular shaped member having elongated slot-like openings therein extending transversely of the direction of the slots in said side members and being positioned between the adjacent ends of said slots, and said resilient body having outwardly extending ribs formed on the sides thereof and each of said ribs being positioned within one of said slot-like openings in said side members of said tubular shaped member and said ribs being slidably displacable in the elongated direction of said slot-like openings for permitting relative movement between said resilient body and said tubular shaped member.

19. A fastening assembly, as set forth in claim 18, wherein said resilient body having protuberances formed on the sides thereof spaced from said ribs and said protuberances being arranged in frictional engagement with the inner surface of said side members of said tubular shaped member.

20. A fastening assembly, as set forth in claim 13, wherein said tubular shaped member having a substantially rectangular cross section transverse to the direction of its elongated dimension.

21. A fastening assembly, as set forth in claim 13, wherein the planes of the ends of said tubular shaped member transverse to its elongated direction being disposed in parallel relationship and the planes of the ends being disposed at an acute angle to the side members of said tubular shaped member.

22. A fastening assembly, as set forth in claim 13, wherein said resilient body having its dimension in the elongated direction of said tubular shaped member being less than the dimension of said tubular member in the elongated direction.

23. A fastening assembly, as set forth in claim 13, wherein said resilient member having its dimension in the elongated direction of said tubular shaped member being equal to the overall dimension of said tubular member in its elongated direction.

24. A fastening assembly, as set forth in claim 13, wherein at least one suspension element secured to and extending downwardly from the lower ends of said tubular shaped member it its support position.

25. A fastening assembly, as set forth in claim 23, wherein said suspension element having a slotted opening adjacent its lower end for receiving a hanger member and the like.

* * * * *